United States Patent
Fisher

(10) Patent No.: US 10,878,330 B2
(45) Date of Patent: Dec. 29, 2020

(54) METHODS AND SYSTEMS FOR IDENTIFYING PATTERNS IN DATA USING DELIMITED FEATURE-REGIONS

(71) Applicant: Jonathan Michael Fisher, Acton, MA (US)

(72) Inventor: Jonathan Michael Fisher, Acton, MA (US)

( * ) Notice: Subject to any disclaimer, the term of this patent is extended or adjusted under 35 U.S.C. 154(b) by 135 days.

(21) Appl. No.: 15/658,104

(22) Filed: Jul. 24, 2017

(65) Prior Publication Data

US 2018/0025284 A1    Jan. 25, 2018

Related U.S. Application Data

(60) Provisional application No. 62/365,577, filed on Jul. 22, 2016.

(51) Int. Cl.

| | |
|---|---|
| *G06N 7/00* | (2006.01) |
| *G06N 3/08* | (2006.01) |
| *G06N 3/10* | (2006.01) |
| *G06N 20/00* | (2019.01) |

(52) U.S. Cl.
CPC .............. *G06N 7/005* (2013.01); *G06N 3/08* (2013.01); *G06N 3/10* (2013.01); *G06N 20/00* (2019.01)

(58) Field of Classification Search
None
See application file for complete search history.

(56) References Cited

U.S. PATENT DOCUMENTS

| | | | | |
|---|---|---|---|---|
| 6,049,793 A | * | 4/2000 | Tomita | G06K 9/6253 706/17 |
| 6,975,764 B1 | * | 12/2005 | Silver | G06K 9/32 382/199 |
| 7,295,706 B2 | * | 11/2007 | Wentland | G01V 11/00 382/181 |
| 2007/0217675 A1 | * | 9/2007 | Mulligan | G06T 7/0004 382/170 |
| 2008/0005091 A1 | * | 1/2008 | Lawler | G06F 16/951 |
| 2015/0160342 A1 | * | 6/2015 | Zweigle | G09B 29/004 356/5.01 |
| 2015/0379425 A1 | * | 12/2015 | Dirac | G06N 20/00 706/12 |
| 2015/0379429 A1 | * | 12/2015 | Lee | G06N 20/00 706/11 |
| 2015/0379430 A1 | * | 12/2015 | Dirac | G06N 20/00 706/12 |

* cited by examiner

*Primary Examiner* — Kaveh Abrishamkar
(74) *Attorney, Agent, or Firm* — Armstrong Teasdale LLP

(57) ABSTRACT

A method and system is provided for identifying patters in datasets by identifying delimited regions of feature-space in which patterns occur. The delimited regions are then combined into an ensemble able to make predictions based on the identified regions of feature-space. The method may be used for classification, for regression, for auto-encoding, for simulation, and for other applications of pattern detection.

20 Claims, No Drawings

METHODS AND SYSTEMS FOR IDENTIFYING PATTERNS IN DATA USING DELIMITED FEATURE-REGIONS

CROSS REFERENCE TO RELATED APPLICATIONS

This application claims the benefit of provisional application No. 62/365,577, filed on Jul. 22, 2016.

SUMMARY

The systems and methods described herein provide a means of identifying patterns in datasets; those patterns may be utilized to make predictions about new data, including in classification or regression, to do auto-encoding, to generate novel simulation data, or to control systems in novel situations.

DETAILED DESCRIPTION

Methods and systems for identifying patterns in data using delimited feature-regions are described below.

An exemplary system includes a computing device and a rectangular set of training data, in which each row contains an instance of the data and each column contains the values for one attribute across the instances. There may also be a similar set of testing data, used for testing the predictions. One or more of the attributes may be considered as a class or classification for each instance, or as a status for each instance. Typically, a classification attribute is limited to a finite number of discrete values, whereas a status attribute may take on any of a continuous range of values.

A method is applied to identify patterns in the data and use those patterns to construct a predictor which may be applied to data not in the training data. Examples of such predictors include classifiers, auto-encoders, simulators, regression calculators, and systems control.

In one embodiment, the phases of the method are:
1. Configure a feature-space wherein points from a dataset may be represented.
2. Identify regions in feature-space wherein points from the training dataset form an identifiable pattern.
3. Construct an ensemble of the feature-regions.

Configure Feature-Space

A feature is a point in a feature-space (defined below). Features can be constructed from the attributes of the dataset. In addition, some or all of the attributes of the dataset can be represented as features.

The constructed features can be whatever is appropriate to the domain from which the instances are sampled. For images, a constructed feature could be an edge or a color-blob. For speech-recognition, a constructed feature could be a phoneme. For natural-language processing, a constructed feature could be a word or a word-stem. One of skill in the art will recognize other possible constructed features, in these or other domains.

For images, edges could be detected using a Canny edge-detector, a Canny-Deriche edge-detector, central differences, differential edge-detection, phase-congruency-based edge-detection, the phase-stretch transform, or another edge-detection method. Further processing such as edge-thinning could also be applied. Blobs could be detected using the Laplacian of the Gaussian, differences of Gaussians, the determinant of the Hessian, or another blob-detection method. Detection of constructed features could be applied to each color-channel separately or to two or more color-channels together. One of skill in the art will recognize that these types of constructed features or other types of constructed features can be detected by various means.

Once the features are constructed or extracted from the data, they are parametrized. For example, each edge in an image can be represented by $(x, y, \alpha)$, where x is the horizontal location of the edge within the image, y the vertical location, and $\alpha$ the angle of orientation.

Feature-spaces can then be constructed from the parameter values. A feature-space is a space of one or more dimensions in which a possible feature is specified by a point. A point in feature-space for a feature is specified by a tuple of numbers delineating the feature. For example, a 9-dimensional feature-space can be constructed to represent triples of edges, given by $(x_0, y_0, \alpha_0, x_1, y_1, \alpha_1, x_2, y_2, \alpha_2)$, where $(x_0, y_0)$ is the absolute location of one of the edges, $\alpha_0$ is the absolute orientation of that edge, $(x_1, y_1)$ is the location of the second edge relative to the first edge, $\alpha_1$ is the orientation of the second edge relative to the first edge, $(x_2, y_2)$ is the location of the third edge relative to the first edge, and $\alpha_2$ is the orientation of third edge relative to the first edge. Each triple of edges from any given image would then be represented by a point in that 9-dimensional feature-space.

Different feature-spaces of different dimensions, representing various attributes and constructed features, can be constructed in the course of the method. One of skill in the art will recognize that there are different ways of constructing feature-spaces for different applications over different domains.

Identify Feature-Regions in Feature-Space

Once a feature-space has been configured, regions in that feature-space wherein points from the training dataset form an identifiable pattern can be identified. A feature-region is defined as a region in feature-space. Different methods can be used to do this depending on the patterns sought. In what follows, an atomic feature is a feature constructed directly from the dataset, as described in the previous section, while a compound feature combines a plurality of atomic features, such as the triple of edges given as an example in the previous section.

A feature is said to be contained in a feature-region if the point representing the feature is within the bounds of the feature-region in feature-space. An instance is said to match a feature-region if it has one or more features which are within that feature-region's in feature-space; in that case the feature-region is also said to match the instance.

The method can search different levels of feature-space, corresponding to different levels of complexity of the features in the feature-space. For example, the method might search a feature-space of atomic features (for example, single edges), or it might search a feature-space of compound features each of which is a pair of atomic features (for example, pairs of edges), or it might start with another level of complexity of compound features.

The method can detect patterned regions of the feature-space in different ways. One way is to use cluster analysis to identify clusters. Another way is to divide the feature-space into buckets, either spatially-uniform buckets or otherwise, and then evaluate each bucket for a desired pattern. Possible patterns sought can include density, skewness, and trends. Note that skewness as defined here refers to a region of feature-space with an atypical relative prevalence of points which have a particular classification value or set of classification values or a particular set of values for one or more attributes. For example, a region in a feature-space representing edges might have a prevalence of edges from images of a particular class which is larger than the typical or average prevalence for that class over the training dataset as a whole. One way to specify the buckets is to define them as the cells of a rectilinear grid in the feature-space. One way to to identify trends in bucket is by performing a linear regression on each bucket or doing some other form of curve-fitting.

Modifying Identified Feature-Regions of Feature-Space

Once a list of patterned feature-regions has been constructed, by the above means or otherwise, those feature-regions might be modified. Regions can be added to the list, feature-regions can be removed from the list, feature-regions in the list can be merged into a new feature-region to be added to the list, a feature-region in the list can be split into two or more feature-regions to be added to the list, a feature-region in the list can be modified by having its boundary changed. Any of those operations can be guided by the density, the skewness, or both, of the feature-region which results from the operation, or by one or more trends within the feature-region which results from the operation.

One way to modify the boundary of a feature-region in feature-space might be to replace it with a hyper-dimensional ellipsoid in approximately the same place in feature-space as the feature-region it replaces; the hyper-dimensional ellipsoid might have its center at the center of the feature-region it replaces, and its axis-length in each dimension might be determined by the width in each dimension of the feature-region it replaces. Another way to modify the boundary of a feature-region in feature-space might be to move the feature-region in one or more dimensions of the feature-space or adjust its scale in one or more dimensions of the feature-space; this could be done by gradient descent or other means.

Increase the Dimensionality of Features

Once a feature-region has been identified, it can be adjusted by increasing its dimensionality. One way to increase the dimensionality of a feature-region is as follows: If the feature-region R has been identified, embedded in the feature-space S, then R can be embedded in a higher-dimensional feature-space S'. For example, if S is a feature-space representing single edges parametrized by $(x_1, y_1, \alpha_1)$ and R is a feature-region in S, then S can be embedded in the space S' representing pairs of edges parametrized by $(x_1, y_1, \alpha_1, x_2, y_2, \alpha_2)$, and R can be embedded in S' as R'. A typical interpretation would be that R' contains pairs of edges, both drawn from the same image, such that the first edge is in R and the second edge takes any value at all.

The boundary of R' could then be adjusted to construct a new feature-region T. One way to do this in the example above would be to partition the subspace of S' corresponding to the second edge of the pair of edges into buckets. All of the pairs of edges from the training dataset such that the first edge in each pair is in R would be in the feature-region R', and can thus be distributed across the buckets. Then the buckets could be examined for a pattern, and that pattern could be used to restrict the boundary of R' down to a new feature-region T. The boundary could also be adjusted further, including along the dimensions of S' corresponding to the first edge in each pair. The criterion used to adjust the boundary of R' to construct T could be density, or skewness, or a combination of density and skewness. Another criterion could be a trend within the feature-region T. One skilled in the art will recognize that other criteria can be used.

Another way to increase the dimensionality of feature-regions is to construct the Cartesian product of two previously-identified feature-regions and then modify the boundary of the resultant feature-region to adjust to a pattern within that resultant feature-region. For example, if the feature-regions $R_1$ and $R_2$ have been identified, embedded in feature-spaces $S_1$ and $S_2$ respectively, a new feature-region T' can be identified as follows: Let T be $R1 \times R_2$, as embedded in $S_1 \times S_2$. Then the new feature-region T' can be constructed by adjusting the boundary of T.

For example, if $S_1$ is a feature-space representing single edges parametrized by $(x_1, y_1, \alpha_1)$ and $S_2$ is a feature-space representing single edges parametrized by $(x_2, y_2, \alpha_2)$, then $S_1 \times S_2$ is a feature-space representing pairs of edges parametrized by $(x_1, y_1, \alpha_1, x_2, y_2, \alpha_2)$). If $R_1$ is a feature-region in $S_1$ and $R_2$ is a feature-region in $S_2$, then $R1 \times R_2$ is a feature-region in $S_1 \times S_2$. A typical interpretation of $R1 \times R_2$ would be that it contains pairs of edges, both drawn from the same image, such that the first edge is in $R_1$ and the second edge is in $R_2$. Using that interpretation, under the definition that $T=R1 \times R_2$, the pairs of edges in T could be examined and the boundary of T adjusted accordingly to construct T'. The criterion used to adjust the boundary of T to construct T' could be density, or skewness, or a combination of density and skewness. Another criterion could be a trend within the feature-region T. One skilled in the art will recognize that other criteria can be used. The adjustment may be accomplished by gradient descent or by other means.

Construct the Ensemble Predictor

Once the feature-regions are constructed they can be combined into an ensemble which can be used to make predictions on data not included in the training dataset.

For example, the ensemble may be used as a classifier to predict classifications. One way to construct an overall classifier from the feature-regions is by assigning, for each class, a match weight and a non-match weight to each feature-region; the overall classifier then assigns a score for each class to each instance which is equal to the sum of the match weights for each feature-region which matches the instance plus the sum of the non-match weights for each feature-region which does not match the instance. Note that each match weight and each non-match weight can be positive, negative, or zero. That score is then used to predict the class(es) for the instance. Typically, if each instance is expected to be of a single class then the instance may be assigned the class for which it has the highest score; if each instance can be of multiple classes, then the instance may be assigned each class for which the score is above some threshold. One way to assign the match and non-match weights to each feature-region is using the method of calculating weights from the Marmax technique. (See Provisional Patent Application 62/334,585.) One of ordinary skill in the art will recognize that there are other ways to assign the match and non-match weights to each feature-region.

Another way to construct an overall classifier from the feature-regions is to assign to each feature-region, for each class, the probability that an instance contained in that feature-region is of that class; the overall classifier then uses those probabilities to calculate the probability that a given instance belongs to each of the classes, based on whether the instance is contained in each of the feature-regions.

The ensemble may be used as a regression calculator to predict values. One way to combine feature-regions into a value predictor or regression calculator is by assigning a weight to each feature-region. Once the weights have been assigned, one way to determine the predicted value for a given data point is to determine which feature-regions contain the data point, choose which of those feature-regions has the greatest weight, calculate the predicted value for the data point according to the trend within that feature-region, and assign that value as the overall prediction of the ensemble predictor for that data point. Another way to determine the predicted value for a given data point is to determine which feature-regions contain the data point, calculate the predicted value for the data point according to the trend within each of those feature-regions, and assign the weighted sum of those calculated values over all such feature-regions, according to the weight of each feature-region, as the overall prediction of the ensemble predictor for that data point. One way to calculate values for the weights is to do curve-fitting on the overall ensemble of feature-regions with the weights as values to be adjusted in the course of the curve-fitting. This may be done by gradient descent or other means.

One way to combine feature-regions into an ensemble to recognize patterns is using Random Forests or another technique for constructing trees. Another way to combine feature-regions into an ensemble to recognize patterns is via Boosting. One way to combine feature-regions into an ensemble to recognize patterns is using the Marmax technique. (See Provisional Patent Application 62/334,585.) One of ordinary skill in the art will recognize that there are other ways to combine the feature-regions into an ensemble to recognize patterns.

The method may be employed for classification, for regression, for auto-encoding, for generation of data as in simulation, for systems control, or other applications, and for any application in which it is desired to detect one or more patterns in one or more datasets. Although the embodiments above are delineated in specific arrangements, one of ordinary skill in the art will understand that, in certain embodiments, the components may be arranged in different configurations, that one or more components may be omitted, and that additional components may be added to provide incidental functionality, without deviating from the scope and spirit of the invention.

One of skill in the art will recognize that the invention may be implemented in software, in hardware, or in a combination of hardware and software. The specification and enumerated possible embodiments are intended only as examples, and the true scope and spirit of the invention should be defined by the claims and their legal equivalents.

What is claimed:

1. A method for identifying a pattern in a training dataset, the method implemented by at least one processor in communication with at least one memory device, the method comprising:
    for each feature-space of a plurality of feature-spaces, identifying, by the at least one processor, at least one feature-region each included in the corresponding feature, wherein each training data-point in the corresponding feature-space is defined by a tuple of numbers, wherein each of the at least one feature-regions corresponds to a multi-dimensional identifiable pattern;
    for each of the plurality of feature-regions, constructing, by the at least one processor, a multi-dimensional boundary which encloses the corresponding feature-region so as to completely enclose a set of training data-points of the training dataset which are associated with the multi-dimensional identifiable pattern and exclude other training data-points of the training dataset, wherein the plurality of enclosed feature-regions form an ensemble; and
    wherein the method further comprises at least one of:
        detecting, by the at least one processor, feature-regions containing a data-point and predicting one or more properties of the data-point corresponding to properties of the feature-region;
        detecting, by the at least one processor, feature-regions containing one or more data-points representing aspects of a data-structure to be compressed and compressing the data-structure by enumerating the aspects of the feature-regions;
        detecting, by the at least one processor, feature-regions containing one or more data-points representing states or partial states of a system and controlling the system by corresponding properties of the feature-region; and
        generating, by the at least one processor, novel points in one or more feature-regions and combining the points to simulate novel data-structures.

2. The method according to claim 1, wherein one or more of said feature-regions are identified by a process comprising:
    identifying a feature-region contained within a feature-space; and
    projecting said feature-space down to a lower-dimensional feature-space; and
    modifying the boundary of said feature-region as embedded within said lower-dimensional feature-space so as to approximately include points which form a pattern and approximately exclude other points to form a new identified feature-region to be included in said ensemble.

3. The method according to claim 1, wherein one or more of said feature-regions are identified by a process comprising:
    identifying a feature-region contained within a feature-space; and
    embedding said feature-space within a higher-dimensional feature-space; and
    modifying the boundary of said feature-region as embedded within said higher-dimensional feature-space so as to approximately include points which form a pattern and approximately exclude other points to form a new identified feature-region to be included in said ensemble.

4. The method according to claim 1, wherein one or more of said feature-regions are identified by a process comprising:
    identifying a plurality of feature-regions each of which is contained within a feature-space; and
    constructing a Cartesian product of said feature-spaces; and
    constructing the Cartesian product of said feature-regions as embedded within the Cartesian product of said feature-spaces; and
    modifying the boundary of the Cartesian product of said feature-regions as embedded within the Cartesian product of said feature-spaces so as to approximately include points which form a pattern and approximately exclude other points to form a new identified feature-region to be included in said ensemble.

5. The method according to claim 1, wherein one or more of said identifiable patterns consists of a feature-region which has a density of points from said dataset differing from the typical or average density of points from said dataset over said feature-space as a whole.

6. The method according to claim 2, wherein one or more of said identifiable patterns consists of a feature-region which has a density of points from said dataset differing from the typical or average density of points from said dataset over said projected lower-dimensional feature-space as a whole.

7. The method according to claim 3, wherein one or more of said identifiable patterns consists of a feature-region which has a density of points from said dataset differing from the typical or average density of points from said dataset over said higher-dimensional feature-space as a whole.

8. The method according to claim 4, wherein one or more of said identifiable patterns consists of a feature-region which has a density of points from said dataset differing from the typical or average density of points from said dataset over said Cartesian product of feature-spaces as a whole.

9. The method according to claim 1, wherein one or more of said identifiable patterns consists of a feature-region which has a skewness of points from said dataset according to one or more classifications or attributes of said points differing from the typical or average skewness of points from said dataset over said feature-space as a whole.

10. The method according to claim 2, wherein one or more of said identifiable patterns consists of a feature-region which has a skewness of points from said dataset according to one or more classifications or attributes of said points differing from the typical or average skewness of points from said dataset over said projected lower-dimensional feature-space as a whole.

11. The method according to claim 3, wherein one or more of said identifiable patterns consists of a feature-region which has a skewness of points from said dataset according to one or more classifications or attributes of said points differing from the typical or average skewness of points from said dataset over said higher-dimensional feature-space as a whole.

12. The method according to claim 4, wherein one or more of said identifiable patterns consists of a feature-region which has a skewness of points from said dataset according to one or more classifications or attributes of said points differing from the typical or average skewness of points from said dataset over said Cartesian product of feature-spaces as a whole.

13. The method according to claim 1, wherein one or more of said identifiable patterns consists of a feature-region which has a trend of points from said dataset according to one or more classifications, statuses, or attributes of said points.

14. The method according to claim 2, wherein one or more of said identifiable patterns consists of a feature-region which has a trend of points from said dataset according to one or more classifications statuses, or attributes of said points.

15. The method according to claim 3, wherein one or more of said identifiable patterns consists of a feature-region which has a trend of points from said dataset according to one or more classifications statuses, or attributes of said points.

16. The method according to claim 4, wherein one or more of said identifiable patterns consists of a feature-region which has a trend of points from said dataset according to one or more classifications statuses, or attributes of said points.

17. The method of claim 1, wherein applying comprises assigning each of the one or more data-points of the dataset to one or more classes by comparing each of the one or more data-points of the dataset to the multi-dimensional boundary.

18. The method of claim 17, wherein the one or more classes comprises multiple classes.

19. A system for identifying a pattern in a training dataset, comprising:
a computing device including at least one processor in communication with at least one memory device, wherein the at least one processor is programmed to:
for each feature-space of a plurality of feature-spaces, identify at least one feature-region each included in the corresponding feature-space, wherein each training data-point in the corresponding feature-space is defined by a tuple of numbers, wherein each of at least one feature-regions corresponds to a multi-dimensional identifiable pattern;
for each of the plurality of feature-regions, construct a multi-dimensional boundary which encloses the corresponding feature-region so as to completely enclose a set of training data-points of the training dataset which are associated with multi-dimensional identifiable pattern and exclude other training data-points of the training dataset, wherein the plurality of enclosed feature-regions form an ensemble; and
where the at least one processor is further programmed to at least one of:
detect feature-regions containing a data-point and predict one or more properties of the data-point corresponding to properties of the feature-region;
detect feature-regions containing one or more data-points representing aspects of a data-structure to be compressed and compress the data-structure by enumerating the aspects of the feature-regions;
detect feature-regions containing one or more data-points representing states or partial states of a system and control the system by corresponding properties of the feature-region; and
generate novel points in one or more feature-regions and combine the points to simulate novel data-structures.

20. A system for identifying a pattern comprising a computing device including at least one processor in communication with at least one memory device, where the at least one processor is programmed to:
receive a training dataset including a plurality of features of a plurality of patterns;
generate a feature-space for each feature of the plurality of features based on the training dataset;
for each feature-space of the plurality of feature-spaces, identify a feature-region in the corresponding feature-space, wherein the feature-region includes a subset of data-points in the training dataset;
for each of the plurality of feature-regions, generate a multi-dimensional boundary which encloses the corresponding feature-region including the subset of data-points in the corresponding feature-region;_and
wherein the at least one processor is further programmed to at least one of:
receive a first dataset, wherein the first dataset includes a first plurality of data-points, and, for one or more of the data-points, detect feature-regions containing the data-point, and predict one or more properties of the data-point corresponding to properties of the feature-region;

receive a first data-structure to be compressed, detect feature-regions each containing one or more data-points representing aspects of the data-structure, and compress the data-structure by enumerating the aspects of the feature-regions;

receive one or more data-points representing states or partial states of a system, detect feature-regions containing each of one or more of the data-points, and control the system by corresponding properties of the feature-region; and generate novel points in one or more feature-regions and combine the points to simulate novel data-structures.

* * * * *